INVENTOR.
Carl W. Kirsch
BY Alfred G. Gross
ATTORNEY.

July 24, 1956 C. W. KIRSCH 2,755,538

COMMUTATOR ASSEMBLING MACHINE

Filed Jan. 5, 1952 9 Sheets-Sheet 2

INVENTOR.
Carl W. Kirsch
BY Alfred G. Gross
ATTORNEY.

COMMUTATOR ASSEMBLING MACHINE

Filed Jan. 5, 1952 9 Sheets-Sheet 3

INVENTOR.
Carl W. Kirsch
BY Alfred G. Gross
ATTORNEY.

INVENTOR.
Carl W. Kirsch
BY Alfred G. Gross
ATTORNEY.

INVENTOR.
Carl W. Kirsch
BY Alfred G. Gross
ATTORNEY.

INVENTOR.
Carl W. Kirsch
BY Alfred G. Gross
ATTORNEY.

INVENTOR.
Carl W. Kirsch
BY Alfred G. Gross
ATTORNEY.

INVENTOR.
Carl W. Kirsch
BY Alfred G. Gross
ATTORNEY.

July 24, 1956 C. W. KIRSCH 2,755,538

COMMUTATOR ASSEMBLING MACHINE

Filed Jan. 5, 1952 9 Sheets-Sheet 9

INVENTOR.
Carl W. Kirsch
BY Alfred G. Gross
ATTORNEY.

United States Patent Office 2,755,538

Patented July 24, 1956

2,755,538

COMMUTATOR ASSEMBLING MACHINE

Carl W. Kirsch, Canton, Ohio, assignor to The Hoover Company, North Canton, Ohio, a corporation of Ohio Application January 5, 1952, Serial No. 265,070

11 Claims. (Cl. 29—205)

My invention relates to a device for automatically assembling the components of a commutator for electrical motors into a complete assembly.

According to my invention, the component parts of a commutator, consisting of alternate insulating and conducting commutator segments, are assembled about a combined sleeve and locking member carrying an insulating ring directly upon the anvil of a riveting or staking machine. When all the insulating and conducting segments constituting a complete commutator annulus are positioned about the locking ring and sleeve, a top locking ring and an insulating ring is placed thereon; the assembly is clamped together, and the sleeve is staked to the top locking ring to form a complete commutator assembly which is ready to be assembled with the other portions of an electrical motor.

In accordance with my invention, the sleeve and lock ring is supported on the staking anvil centrally of a rotatable and slidable assembly jig having a plurality of circumferentially spaced, axially projecting fingers forming pockets each adapted to receive one conducting segment and one insulating segment. An automatic mechanism simultaneously feeds an insulating segment and a conducting segment into one of the pockets of the assembly jig, after which the assembly jig is indexed one pocket and the process is repeated until a complete annulus is formed. When a complete annulus is formed, the jig is axially withdrawn from the assembled annulus and the same is automatically clamped about the sleeve. This process engages the anchoring tangs of the segments with the lock ring. A top locking ring is then placed over the assembled annulus and the staking machine operated to stake the sleeve to the top ring to secure all the aforementioned parts in a completed unitary assembly which is ready to be connected in and assembled upon the shaft of an electric motor.

It is accordingly a principal object of the present invention to provide a commutator asembling machine which automatically assembles all the parts thereof into a complete finished commutator in a single location in which the final staking step is accomplished. It is also an object of the present invention to provide a commutator assembling machine which is economical, efficient and simple in operation requiring a minimum of handling operations of the parts of the commutator during the assembling process.

Other objects and advantages of the invention will become apparent as the description proceeds when taken in connection with the accompanying drawing, in which.

Figure 1:
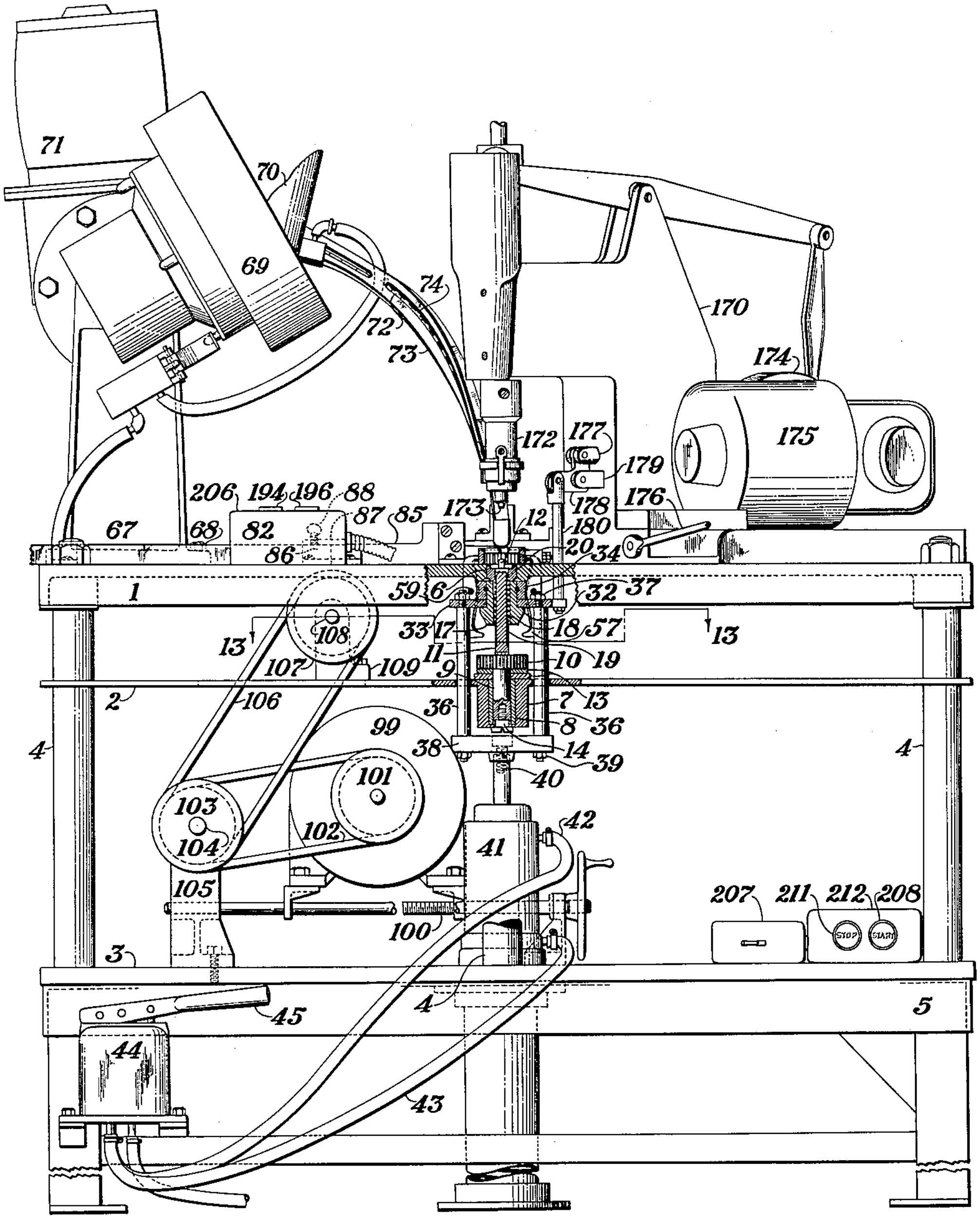
Figure 1 is a front elevational view of my commutator assembling machine having the assembly jig structure illustrated in section.

Referring now to the drawing in detail, and first to Figure 1 thereof, my commutator assembling apparatus includes a main work table or plate 1 overlying spaced secondary supporting plates 2 and 3 which are held in assembled relation by heavy supporting pillars 4. The foregoing frame structure is supported upon a base frame indicated generally at 5, composed of angle iron members suitably joined together and supporting the frame structure comprising the elements 1 to 4 inclusive.

The main work surface 1 is provided in its central area with an opening 6 directly overlying and concentric with an integral cup 7 depending from the underlying supporting plate 2. The cup 7 has a central bore within which is mounted a bushing 8 rotatably supporting and alinging a journal 9 which carries a ratchet gear wheel 10 and an upwardly projecting pillar 11 forming the anvil of a press or staking apparatus to be described more fully hereinafter. The upper portion of the pillar 11 has a centrally situated upwardly projecting pilot pin 12 for a purpose to be described hereinafter. The gear 10 is spaced from the plate 2 by a pair of pressure plates 13 which serve to transmit the pressure of the riveting or staking hammer to the frame of the machine via the work table or plate 2. A stud 14 is threaded into the bottom portion of the journal 9 extending through the bottom of the cup 7 to prevent the journal 9 from rising vertically out of engagement with the bushing 8.

The anvil 11 slidably supports a collar 17 carrying keys 18 engaging in keyways 19 in the pillar 11 to prevent relative rotary motion therebetween.

Figure 3:
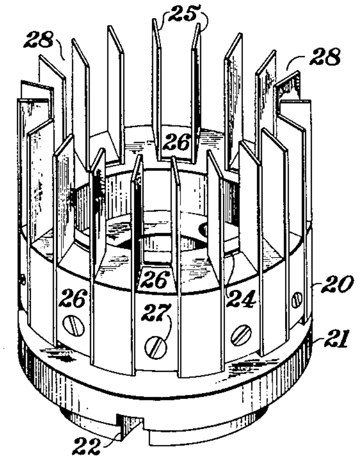
Figure 3 is a perspective view of a segment assembling jig.
Figures 9, 10:
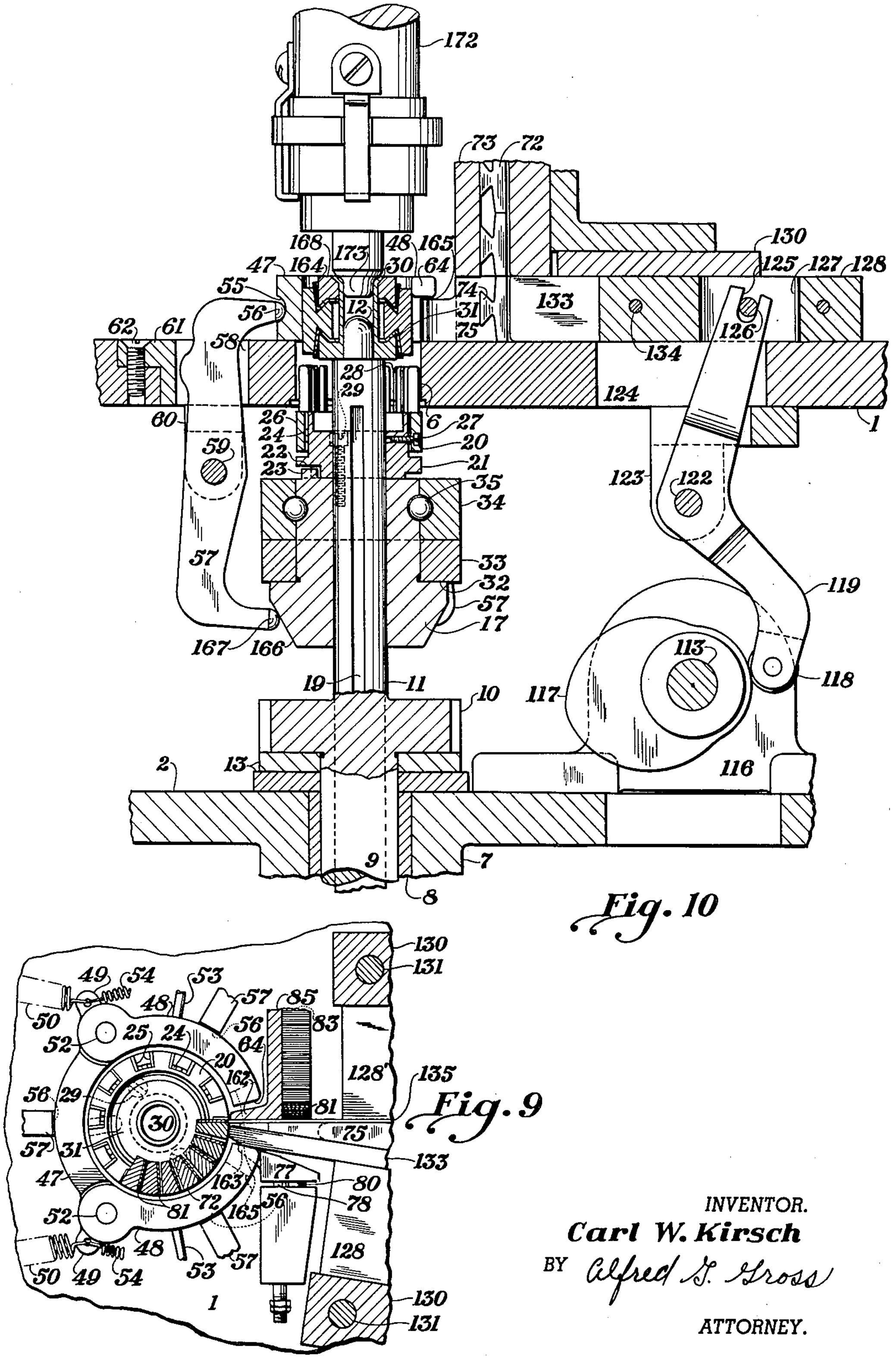
Figure 9 is a fragmentary view similar to Figure 7 illustrating the feed ram in the segment delivery position.
Figure 10 is a partial sectional elevational view through the assembly jig and feed ram structure illustrating the staking or riveting press in the final staking or riveting position thereof.

A segment jig 20, more fully illustrated in Figures 3, 9 and 10, rests upon the upper end of the collar 17 and surrounds the upper end of the pillar 11. The segment jig 20 comprises an annular frame member 21 provided on its under surface with a keyway 22 registering with and engaging a key 23 projecting from the upper end face of the collar 17 to prevent relative rotary motion between the parts. The upper portion of the frame member 21 is provided with a plurality of circumferentially spaced slots 24, see Figure 7, each receiving a pair of axially extending divider members 25 positioned adjacent the opposite radial walls of the slots 24 and held therein by wedge members 26 drawn into wedging engagement with the dividers 25 by studs 27 extending through the wedges 26 and threading into the frame member 21. The dividing members 25 project upwardly above the upper face of the jig frame 21 and are equally spaced circumferentially of the jig to form a plurality of equally spaced circumferential pockets 28 around and on top of the surface of the jig frame 21. The assembly jig 20 is secured to the slidable collar 17 by means of a stud 29, see Figure 10, extending through a suitable opening in the jig frame and threading into the upper end of the collar 17. The jig 20 surrounds a combined sleeve and lock ring 30 which is centered on the pillar 11 by the pilot 12. An insulating ring 31, preferably of mica, rests on the lock ring portion of the member 30. These parts are manually placed on the pillar 11 as the first step in assembling a commutator.

The lower end of the slidable collar 17 is enlarged to form an upwardly facing shoulder 32 upon which is seated a yoke 33 having portions extending circumferentially outwardly of the enlarged portion of the collar 17. The collar 17 forms the inner member of a ball bearing structure including an outer race member 34 rotatably mounted with respect to the collar 17 upon the ball bearings 35 and bearing upon the upper face of the yoke 33 to prevent relative axial movement between the collar 17 and the yoke 33.

The yoke 33 is connected to a pair of elongated post members 36, see Figure 1, by means of securing nuts 37 engaging threaded extensions on posts 36 extending through openings in the yoke 33. The posts 36 extend through suitable openings in the work plate 2 to a point below the lower end of the cup 7 at which point the members 36 are secured to a cross head 38 by means of suitable nuts 39 engaging threaded extensions on the pillars 36 extending through the cross head. The cross head 39 is carried by the upper end of a piston rod 40 of an air cylinder indicated at 41. The purpose of the air cylinder is to raise and lower the collar 17 and its appurtenant parts through their engagement with the yoke 33. The air cylinder 41 is of a known type, indicated herein only by outline, which is supplied with air at opposite ends thereof by hoses 42 and 43 which connect with a control valve 44 having an operating handle 45 for raising or lowering the collar 17. The control valve 44 is of the type which is biased to the position illustrated in Figure 1 in which the piston has operated to raise the collar 17 until the bearing race 34 engages with the under surface of the work table 1. This is the normal assembling position of the parts and also their uppermost position. When the handle 45 is depressed, the cylinder lowers the collar 17 from the position illustrated in Figure 1 for a purpose to be described hereinafter.

Figure 7:
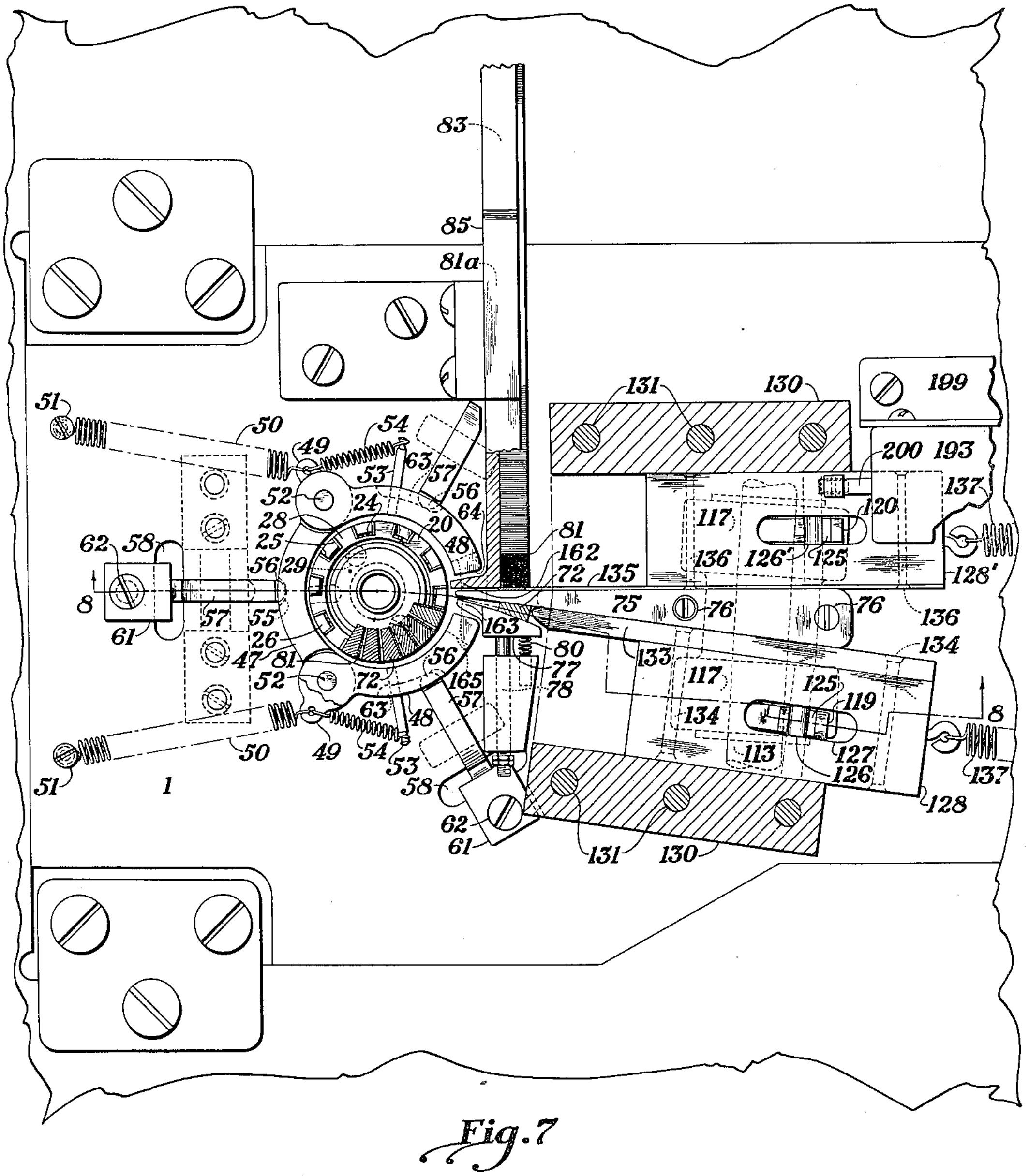
Figure 7 is a top plan view partly in section illustrating the assembly jig and fed ram relationship.
Figure 8:
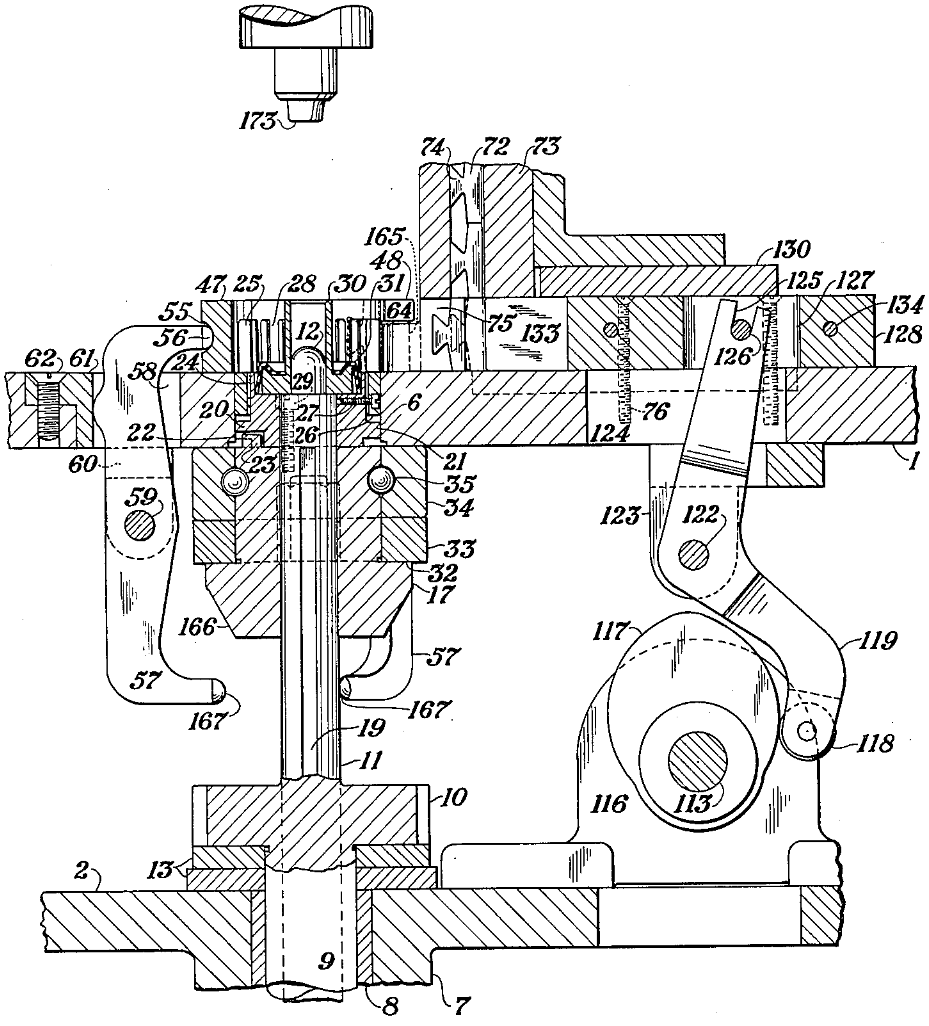
Figure 8 is an elevational sectional view taken along the line 8—8 of Figure 7 looking in the direction of the arrows.

As shown most clearly in Figure 8, the top surface of the assembly jig forming the bases of the pockets 28 is substantially flush with the top surface of the work table 1 in the upper position of the collar 17. The pocket forming dividers 25 are surrounded by a clamping structure, see Figure 7, comprising a main jaw 47 and a pair of auxiliary jaws 48. The clamp jaw 47 is provided with laterally extending ears 49 to which are attached tension springs 50 anchored to the work table 1 by means of studs 51. The jaw 47 carries pivot pins 52 at its opposite ends upon each of which one of the secondary jaws 48 is pivotally mounted. The jaws 48 carry radially projecting pins 53 connected by short tension springs 54 to the ears 49 which tend to rotate the jaws 48 away from each other into open position. The jaw 47 is provided with an indentation 55 within which is seated a projecting end 56 of a rocker arm 57 which extends through an opening 58 in the plate 1 and is pivoted upon a pin 59, see Figure 8, carried by a bracket 60 depending from the lower face of the plate 1. The face of the rocker 57 radially outwardly of the anvil 11 is positioned to abut against a hardened insert 61 positioned in the opening 58 and secured to the plate 1 by studs 62. The jaws 48 bear upon the rocker arms 57 identical with the rocker arm 57 engaging the jaw 47. The jaws 48 are provided with circumferentially elongated grooves 63, Figure 7, otherwise corresponding to the indentation 55 in the jaw 47 and engaging the ends 56 of their associated rocker arms 57. The springs 50 maintain the jaw 47 in engagement with the rocker arm 57 and force the rocker into engagement with its associated pressure plate 61. The springs 54 similarly maintain the jaws 48 each in engagement with its associated rocker arm 57 which, in turn, are forced into engagement with their associated pressure plates 61 to position the clamp structure as shown in Figure 7 in spaced relation to the jig 20 and to form a feed opening 64 positioned between the opposed ends of the jaws 48.

Referring now to Figure 1, a hopper support standard 67 is secured to the top surface of the work plate by means of bolts 68. The upper end of the standard 67 supports an automatic feed hopper mechanism of a known type. This mechanism per se forms no part of my invention, as it is a commercial product. The feed mechanism includes a hopper 69 having a filling spout 70 into which material to be sorted is fed. The internal apparatus of the hopper is driven by an electric motor and speed reducing assembly 71 also mounted upon the standard 67. Commutator conducting bars 72 are dumped into the spout 70 and the hopper mechanism discharges them into a curved chute 73 resting on their backs and in end-to-end relationship. The chute 73 directs the bars onto the surface of the plate 1 adjacent but in spaced relation to the opening 64, see Figure 8. At this point, the lowermost commutator conducting segment, hereinafter referred to as bars in the specification and claims, stands vertically with respect to the surface of the plate 1 with its back directed radially away from the assembly jig 20 and with its locking tang portion 74 directly radially towards the assembly jig.

The lower end of the chute 73 terminates above the surface 1 a distance equal to the length of one bar so that the lowermost bar may drop from the chute to rest upon the work surface 1 while retaining the next bar at the lower end of the chute. As a bar 72 drops from the end of the chute 73, it rests against a wedge-shaped guide plate 75, see Figure 7, secured to the work surface 1 by studs 76 and having a forward end portion projecting into the opening 64 between the clamp jaws 48. The opposite side of the bar 72 engages the angularly positioned face of a guide plate 77 carried by a rod 78 which is slidably mounted in a block carried by the upper surface of the work table 1. A compression spring 80 urges the block to the left, as viewed in Figure 7, so as to retain the wedge-shaped bar 72 in fixed position upon the upper surface of the work table 1.

Figure 4:
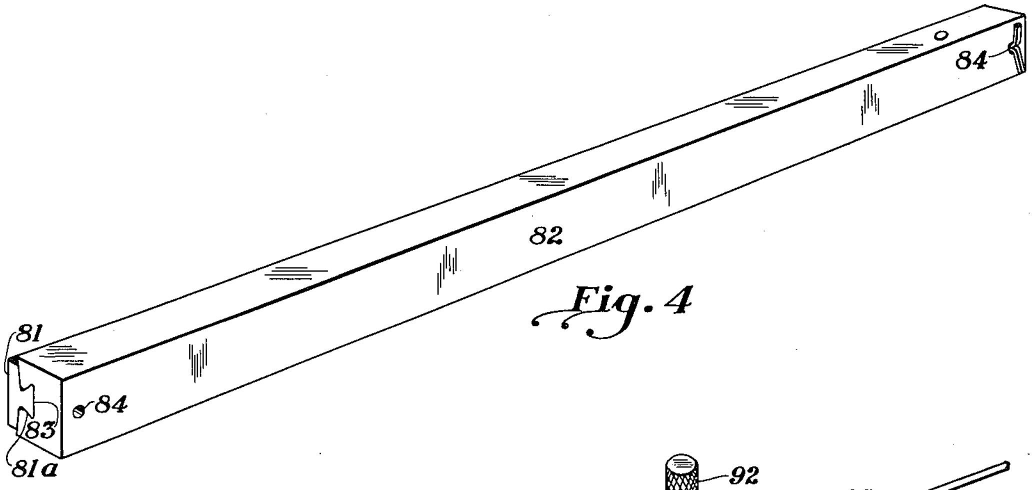
Figure 4 is a perspective view of an insulating segment magazine.
Figure 5:
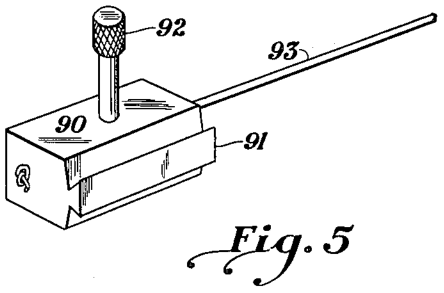
Figure 5 is a perspective view of a feed bar for forcing insulating segments through the feed magazine into the segment assembling mechanism.

Insulating commutator segments 81, hereinafter referred to as insulators in the specification and claims, made of paper, mica or other suitable insulating material, are supplied to the apparatus in a magazine 82, see Figure 4, into which they are charged by a suitable mechanism associated with the stamping machinery which forms the individual insulators 81. The insulators, like the bars, are generally T-shaped, having wedge shaped tangs 81*a* as is common in commutator elements. The magazine 82 is provided with a wedge-shaped slot 83 designed to receive the locking tangs 81*a* of the insulators to hold the same in the rack with the cross-bar sections thereof exposed. The magazine 82 is provided with holes 84 adjacent each end thereof adapted to receive cotter pins to retain the insulators in the rack during handling and mounting upon the assembling machine. A filled magazine 82 is placed upon the work surface 1 having one end abutting a track 85, see Figure 2, which is identical in figuration with the magazine 82 and terminates adjacent the bar 75 a distance therefrom equal to the thickness of one insulator. The magazine 82 is secured to the work table 1 by being fitted under a clamp plate 86 bolted to the table 1 and having an over-lapping lip 87 carrying a thumb screw 88 which is tightened to anchor the magazine 82 to the table 1 in abutting relation with the fixed track 85. Insulators are fed through the magazine 82 and track 85 by means of a feed block 90, see Figures 2 and 5, which is provided with a projecting portion 91, shaped similarly to the anchoring tangs 81*a* of the insulators, adapted to slide within the slot 83 of the magazine 82 and track 85. One surface of the block 90 carries a manipulating pin 92 for the purpose of starting and removing the same from the magazine 82. The block 90 is fed along the magazine 82 to the right as viewed in Figure 2 by a cord 93 anchored at one end to the block 90 and extending around idler pulleys 94 and 95 to the back of the machine at which point it carries a weight 96. The pulleys 94 and 95 are suitably rotatably mounted upon the work surface 1 as shown. The pressure of the block 90 feeds the insulators to the right as viewed in Figure 2 and the lead insulator is positioned in the space between the end of the track 85 and the guide bar 75.

It is apparent from the immediately preceeding description that the apparatus so far described positions a bar and an insulator on opposite sides of a guide bar 75, resting on their ends with locking tangs facing radially inwardly towards the assembly jig in position to be fed into the jig through the opening 64 between the jaws 48. The mechanism by which the bars and insulators are fed into the assembly jig will now be described.

Referring to Figure 1, a main drive motor 99 is supported upon a belt tightening apparatus of a known type indicated generally by the reference character 100. The motor 99 carries a pulley 101 driving a belt 102 which drives a double groove pulley 103 mounted upon a jack shaft 104 supported by a pedestal 105 which is secured to the lower supporting plate 3. The pulley 103 drives a belt 106 which in turn drives a pulley 107 mounted upon a shaft 108 carried by a support bearing 109 secured to the intermediate supporting plate 2.

Figure 13:
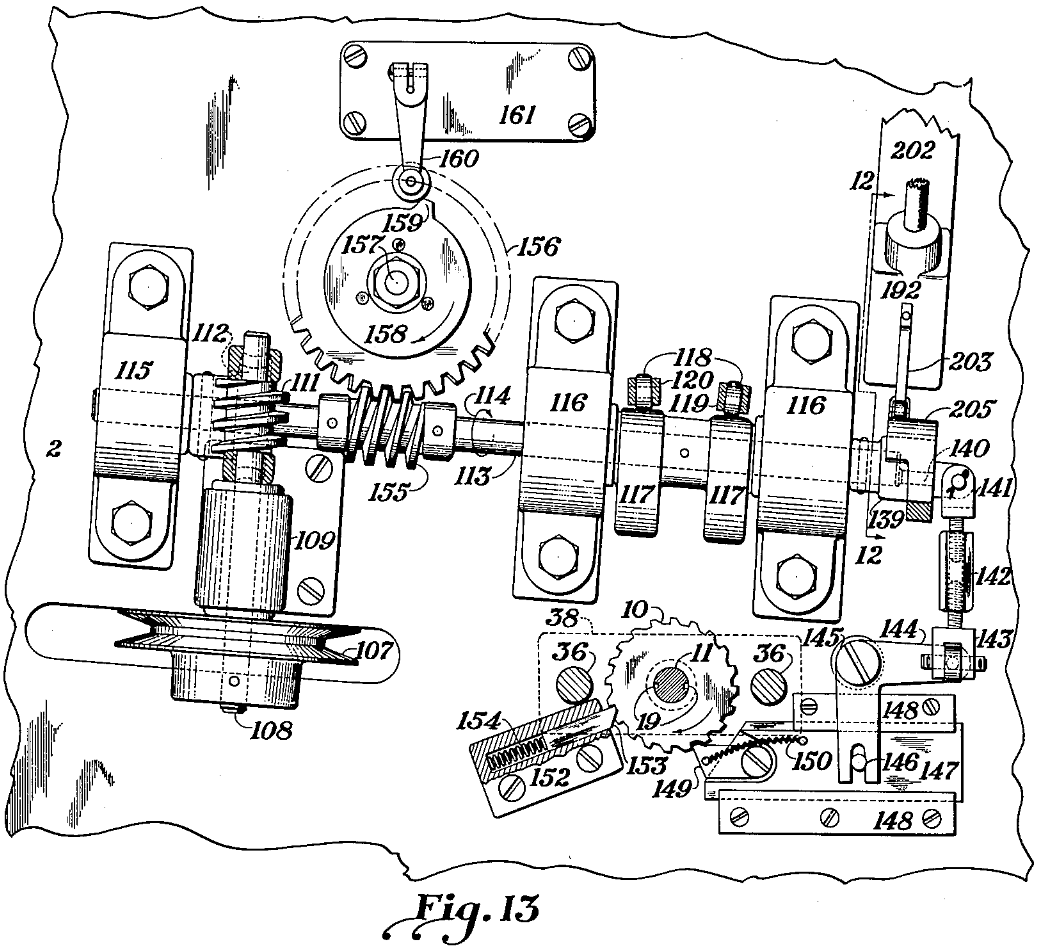
Figure 13 is a sectional view taken along the line 13—13 of Figure 1, looking in the direction of the arrows, illustrating the drive mechanism for the various parts of the apparatus.

Referring now more particularly to Figure 13, the shaft 108 has one end projecting beyond the bearing 109 carrying a worm 111 engaging with a worm gear 112 fixedly mounted upon a main drive shaft 113 which is driven in the direction of the arrow 114 from the main motor 99 through the medium of the mechanism just described. The shaft 113 has one end thereof adjacent the worm gear 112 supported by a bearing block 115 which is mounted upon the supporting plate 2. A pair of spaced bearing blocks 116 support the other end portion of the shaft 113.

The shaft 113 is provided with a pair of cams 117 positioned between the bearing blocks 116 which are engaged by bearing rollers 118 pivotally carried in the lower ends of identical bars and insulator ram driving rockers 119 and 120, respectively. Referring now to Figure 8, the rocker arm 119 is illustrated in side elevation. The rocker arm 119 is pivotally supported upon a pin 122 carried by a bracket 123 depending from the lower side of the plate 1 and projects through an elongated slot 124 in the work plate 1. The upper end of the rocker 119 is slotted as indicated at 125 and engages a pin 126 extending across a slot 127 formed in a ram driving block 128.

Figure 2:
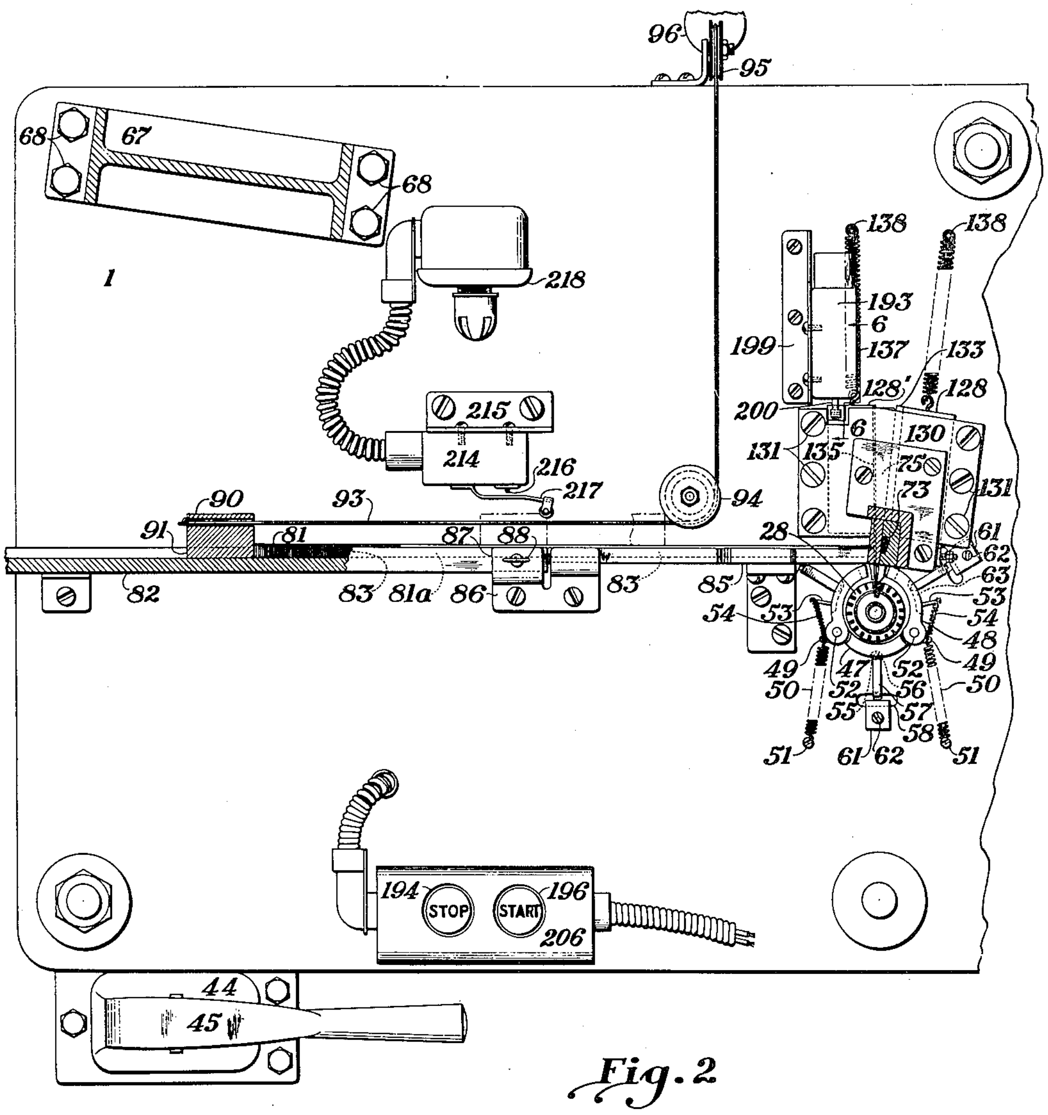
Figure 2 is a top plan view of the apparatus having certain parts thereof shown in section below the level of the riveting or staking press mechanism.

The drive block 128 slidably rests upon the upper work surface 1 and is held and guided thereon by means of a U-shaped guide bracket 130, see Figure 2, secured to the upper face of the work plate by means of studs 131. The bracket 130 overlies the bar 75, the bar feed mechanism and the segment feed mechanism to be described. One side edge of the drive block 128 carries a bar segment feed ram member 133 which is secured to the feed block by rivets 134. The side face of the ram 133 engages the side face of the guide member 75 against which the bar 72 is engaged by the spring pressed member 77.

The rocker arm 120 engages a ram feed bar structure identical with that described immediately above in connection with the bar feed ram and corresponding parts of this ram are given the same reference characters as the parts of the bar feed ram distinguished by the addition of a prime. The block 128′ is slidable on the table 1 and carries a thin insulator segment feed ram 135 which is secured thereto by rivets 136. One side of the ram member 135 bears upon that face of the guide member 75 against which the insulators are fed from the guide rack 85. The other side face of the block 128′ bears on the bracket 130.

Due to the wedge shape of the bar segments 72, they are fed through the opening 64 by the guide structures 75, 77 at an angle to a radius of the assembly jig. The flat insulators are however fed radially of the assembly jig. It is apparent from the foregoing that rotation of the shaft 113 will actuate the cams 117 and rocker arms 119—120 to reciprocate the rams 133 and 135. As these rams are fed forwardly as viewed in Figure 7, a bar and insulator will be forced thereby through the opening 64 into one of the pockets 28 in the assembly jig. As the rams are withdrawn, a fresh bar and segment will be fed into position in front of them from the chute 73 and track 85 respectively. It is apparent from Figure 7 that the ram 135 effectively prevents feeding of a segment from the rack 85 when the ram is advanced on a feed stroke. As shown most clearly in Figure 8, the ram 133 advances a bar along the surface of the work plate 1 and passes under the lowermost bar in the chute 73 to hold the same in the chute until the ram has withdrawn to the solid line position of Figure 8, whereupon a new bar may drop by gravity from the chute into feeding position.

The blocks 128, 128′ are biased to the retracted position to maintain the rocker arms 119, 120 in engagement with the cams 117 by means of stiff tension springs 137 secured to the rear end of each block and to pins 138 carried by the work table 1. Due to the angularity of the feed rams, each of the rocker arms 119, 120 is mounted upon an axis at a slight angle to the axis of the shaft 113. For this reason, the drive rollers 118 wipe across the faces of the wide cams 117 as the shaft 113 rotates.

The assembly jig 21 is indexed circumferentially a distance equal to one of the pockets 28 in synchronized relationship with the feeding strokes of the rams 133 and 135. To accomplish this, the free end of the shaft 113, see Figure 13, carries a drive member 139 to which is pivoted a pin 140 slightly offset from the axis of the shaft 113 to form a drive crank. The end of the pin 140 is pivotally connected to a clevis 141 on the end of an adjustable rod 142, the end of which is connected by a clevis 143 to the end of a bell crank 144 pivotally supported upon a stud 145 secured to the supporting plate 2. The drive end of the bell crank 144 has a pin and slot connection 146 with a slider 147 slidably supported and guided upon the upper surface of the plate 2 by guide bars 148 which are bolted to the plate 2. The end of the slider 147 pivotally carries a detent 149 which engages the ratchet wheel 10. A small tension spring 150 secured to the slider 147 and the detent 149 maintains the detent in engagement with the ratchet wheel 10. When the shaft 113 is rotated, the slider 147 is reciprocated which indexes the wheel 10 and jig 20 in a step-by-step manner. The number of teeth on the ratchet is equal to the number of pockets 28 in the supporting jig 20 so that one revolution of the ratchet effects one revolution of the supporting jig. A block 152 is bolted to the supporting surface and slidably supports a plunger 153 urged into engagement with the ratchet wheel 10 by a spring 154 which serves to prevent reverse rotation of the ratchet wheel 10.

The crank 140 is so positioned relative to the cams 117 that the detent 149 completes its feeding or rotating and indexing stroke while the rams 133 and 135 are withdrawn. During the feed stroke of the rams 133 and 135, the slider 147 is moving to the right as viewed in Figure 13 so that the assembly jig 20 is held stationary at this time by the spring pressed plunger 153. The foregoing operation continues until the assembly jig has made one complete revolution at which time each of the pockets 28 contains one bar and one insulator.

The shaft 113 carriers a worm 155 engaging with a worm gear 156 pivotally mounted upon a support bearing 157 carried by the work surface 2. A cam member 158 is attached to the upper surface of the worm gear 156 and is provided with a projection 159 positioned to engage the actauting arm 160 of a control switch 161. Each time the cam 158 makes a complete revolution, which corresponds to a complete revolution of the assembly jig 20, the projection 159 actuates the arm 160 to open circuit the switch 161, which de-energizes the bar and segment assembly apparatus, in a manner to be described hereinafter, with the feed rams in retracted position as shown in Figure 7.

Entry of the insulators and bars into the assembly jig is facilitated by projecting tongues 162 and 163, see Figure 7, on the trackway 85 and spring pressed guide member 77, respectively. The projecting tongues 162, 163 and the end of the central guide bar 75 terminate adjacent the periphery of the assembly jig 20 and extend completely through the opening 64 between the ends of the clamp jaws 48. The foregoing projecting portions of the bar and insulator guide members are undercut to have a lesser height than the elements and a lesser height than the jaws 48. The juxtaposed ends of the jaws 48 are undercut, as indicated at 165, so that the remaining portion thereof may pass over the projecting portions of the guideways to close the gap 64 thereabove in a manner to be described hereinafter.

When the apparatus has stopped, signalling the completion of a commutator annulus, the operator places the upper insulating ring 164 and upper locking ring 168 on the assembled annulus and the sleeve 30. The operator now depresses the air control valve handle 45 which operates the air cylinder 41 to lower the sleeve 17 and assembly jig 20 supported thereupon. As the collar 17 lowers, it first withdraws the dividing elements 25 from interleaved relationship with the elements of the commutator annulus which then drop down and rest upon the insulating ring 31 carried by the sleeve structure 30. The initial engagement between the bar and segment locking tangs 74 and 81*a* and the insulating ring 31 draws the annulus elements slightly radially inwardly so that they seat by gravity on the insulating ring structure. As the pocket forming members 25 are withdrawn from the annulus, a conical surface 166 on the lower enlarged portion of the sleeve 17 engages projecting fingers 167 formed on the lower ends of the rocker arms 57, causing the upper fingers 56 of the arms to rock radially inwardly with respect to the axis of the anvil 11 and to draw the clamping jaws 47 and 48 tightly about the assembled annulus until the jig, annulus and clamping jaws assume the position illustrated in Figure 10. When this operation is completed, all the elements of the finished commutator are positioned on the staking anvil and are held in substantially final assembled relation by the clamping jaws 47 and 48.

The final assembly operation is performed by a staking or riveting apparatus of a known type illustrated in Figure 1. This apparatus comprises a standard 170 secured to the work surface 1 and supporting a staking or riveting ram 172 having a forming tool 173 carried on its lower end and in axial alignment with the anvil 11. The staking mechanism also includes a drive mechanism indicated generally by the reference character 174 for raising and lowering the ram which mechanism is actuated by an electrical motor 175. An operating handle 176 is provided on the pedestal 170 for actuating the drive mechanism to lower the ram 172 when it is desired to perform a staking operation.

The ram mechanism is provided with a safety mechanism which prevents actuation of the lever 176 to lower the ram at an undesired time. In the present instance, the safety mechanism comprises a locking plunger 177 connected to a bell crank 178 pivotally supported by bracket arms 179 on the standard 170. The bell crank is connected by a rod 180 with the yoke 33 and locks the handle 176 against actuation unless the air cylinder has first been operated to lower the collar 17 and assembly jig 20. When this operation has been completed, the handle 176 is freed and the staking ram may be actuated at will by the operator.

After assembly of the locking ring 168, the staking ram is actuated and depressed to the position illustrated in Figure 10, at which time the upper end of the sleeve 30 is staked or riveted over against the upper locking ring 168, thereby firmly securing all parts of the assembled commutator in final assembled relationship.

Figure 11:
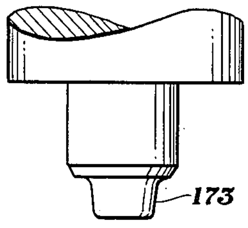
Figure 11 is a view similar to the Figure 10 showing the position of the parts as a completed commutator is ejected from the assembling seat in the machine.
Figure 11:
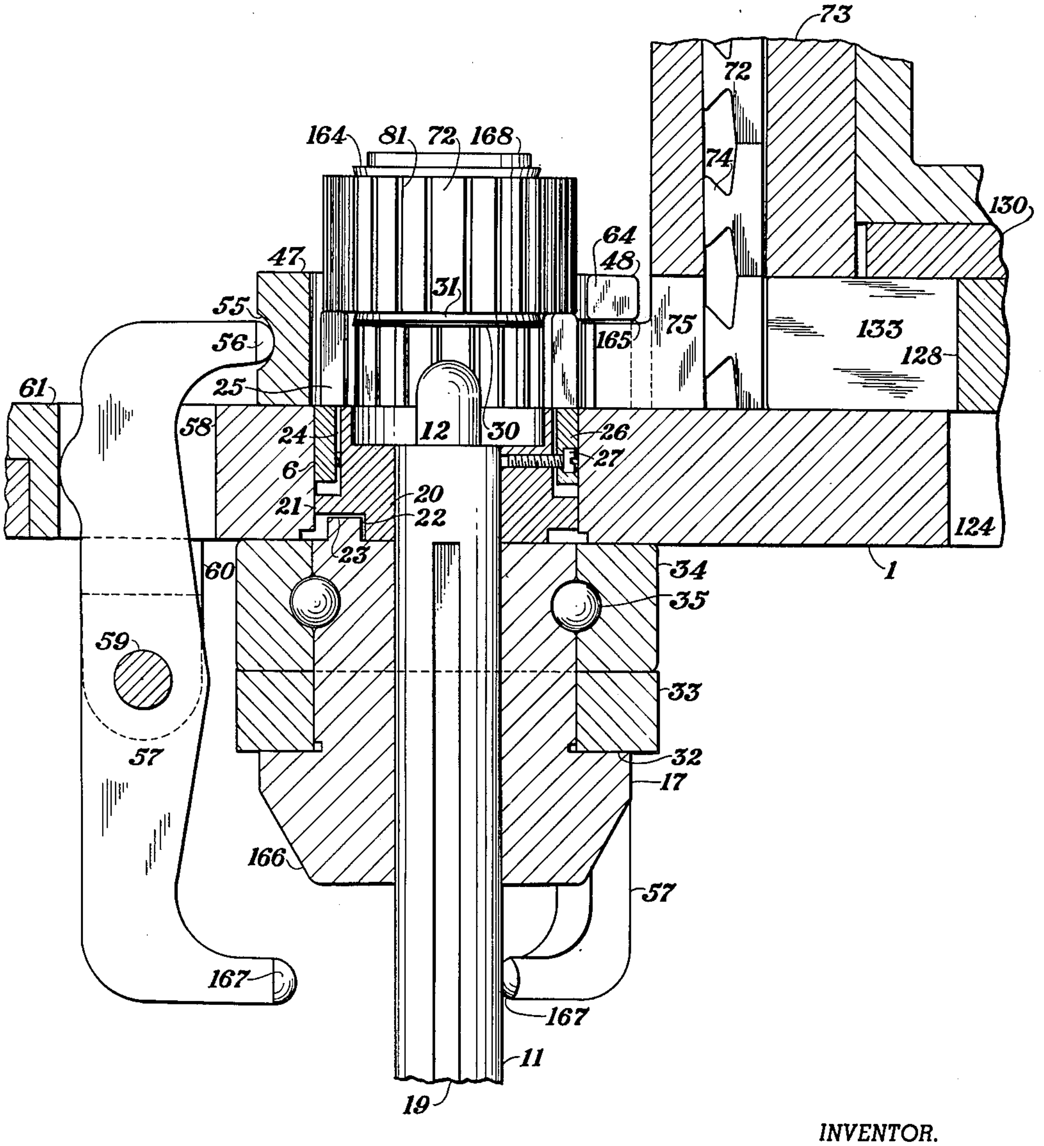

The operator next releases the handle 176 which causes the ram 172 to rise away from the assembled commutator into the inactive position illustrated in Figure 1. The operator next raises the air valve handle 45 to the position of Figure 1 which actuates the air cylinders to raise the collar 17 and its supported parts. As the collar 17 rises, the rocker arms 57 are released from the conical section 166 which releases the clamp jaws 47 and 48. The tension springs 50 and 54 then immediately bias the clamp jaws out of engagement with the assembled commutator and the rising dividing members 25 engage the lower surface thereof and raise the same free of the pilot 12 into the position illustrated in Figure 11. The completed commutator is removed from the apparatus manually which is then ready to begin assembly of a new commutator.

Figure 14:
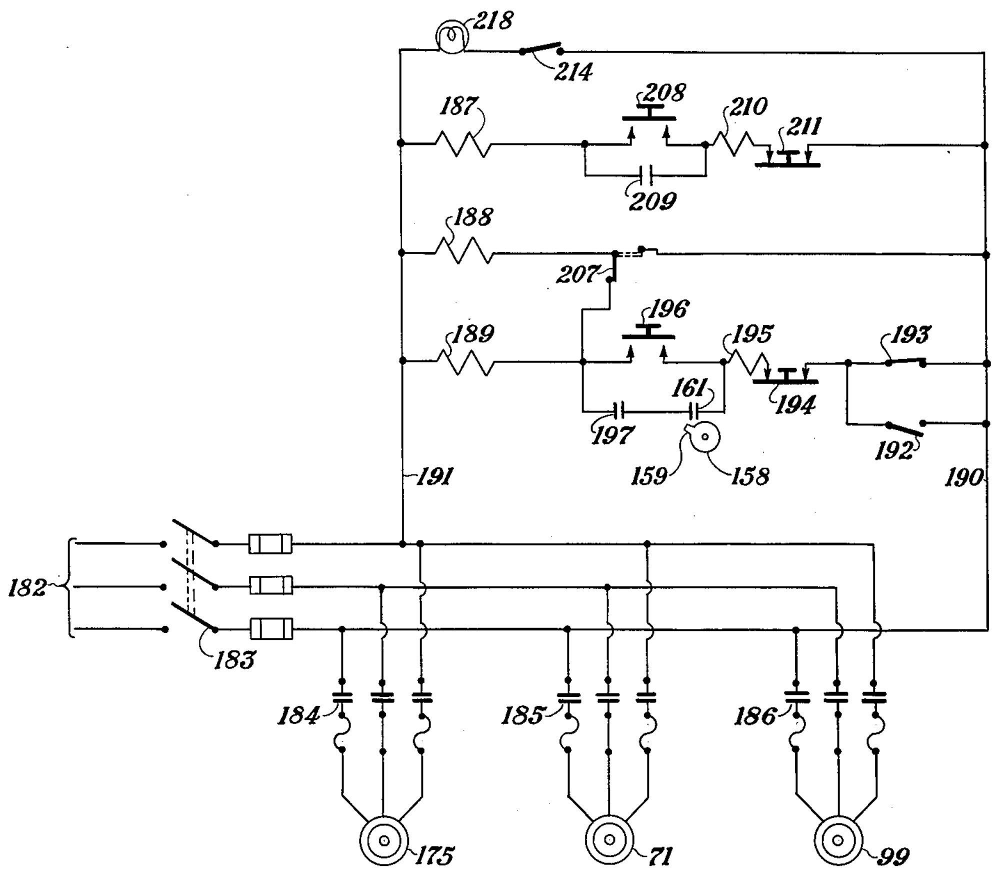
Figure 14 is a schematic wiring diagram of the electrical control mechanisms.

Referring now to Figure 14, there is shown a schematic wiring diagram of the electrical controls of the apparatus. All the elements forming the control mechanism are of conventional type and they are shown only schematically.

The apparatus is energized by a three phase supply line indicated generally by the reference character 182, having a main manual line switch 183 for completely energizing and de-energizing the entire apparatus. The main drive motor 99, power press motor 175 and bar hopper drive motor 71 are each connected to the line 182 through sets of control contacts 186, 184 and 185, respectively. The contacts 184, 185 and 186 are controlled by magnetic relays 187, 188 and 189, respectively, and are of the type which are normally biased to open circuit position and are closed only when the associated relay coils are energized.

The control mechanisms are all energized from conductors 190 and 191 connected to the outside lines of the three phase line 182.

The main drive motor 99 is energized through a pair of shunt connected switches 192 and 193 which are connected to the line 190 and series connected with a circuit interrupting normally closed stop switch 194. The normally closed stop switch 194 is serially connected with a switch relay coil 195, a normally open starting switch 196 and the relay 189, for actuating the contacts 186, which is connected to the supply line 191. The starting switch button 196 is shunted by a normally open switch 197, actuated to closed position by the relay coil 195, and the serially connected cam operated switch 161. To start the apparatus, assuming either or both of the switches 192 and 193 are in closed circuit position, the operator momentarily closes the normally open switch 196 to complete the circuit through the relay 195 energizing the same to close the contacts 197. The normally open switch 196 must be held in closed position long enough for the relay coil 189 to close contact 186 and energize the motor and for the motor to move the cam protuberance 159 a sufficient arcuate distance to permit switch 161 to close.

A shunt circuit around the normally open switch 196 is then completed and the motor 99 will continue to operate until the circuit to the relay 189 is interrupted by opening switches 192 and 193 or 161. If it is desired to stop the machine, the normally closed switch 194 is actuated by the operator to open position long enough to de-energize the relay 195 which then causes contacts 197 to open and to de-energize the motor 99.

Figure 6:
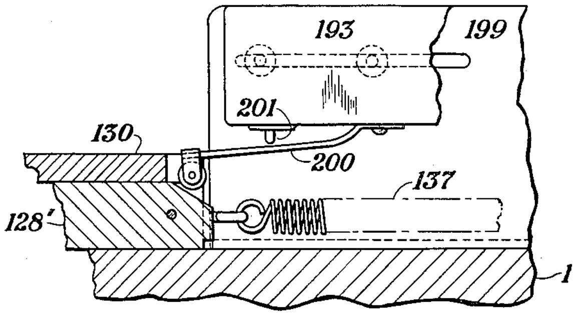
Figure 6 is a partial sectional view taken along the line 6—6 of Figure 2 illustrating a feed ram actuated safety switch.

The switch 193, see Figures 2 and 6, is supported upon a bracket 199 secured to the work surface 1 rearwardly of the ram guide structure 130. The switch 193 is of the normally open circuit type and is provided with an actuating arm 200 spring biased away from the switch actuating button 201. The arm 200 is in the path of the insulator ram block 128'. When the ram is in the advanced position indicated in Figure 6, it disengages from the arm 200 which then moves away from the button 201 under its inherent spring bias and allows the switch to open. As soon as the ram retracts under the influence of its spring 137, it engages the arm 200 and biases the same into engagement with the button 201 to actuate the switch 193 to closed circuit position. Should the ram split an insulator and jam in the advanced position, the switch 193 will be open circuited and will thus de-energize the main drive motor 99. The foregoing de-energization of the main drive motor by the switch 193 will be circumvented as long as the shunt connected switch 192 is in closed circuit position.

Figure 12:
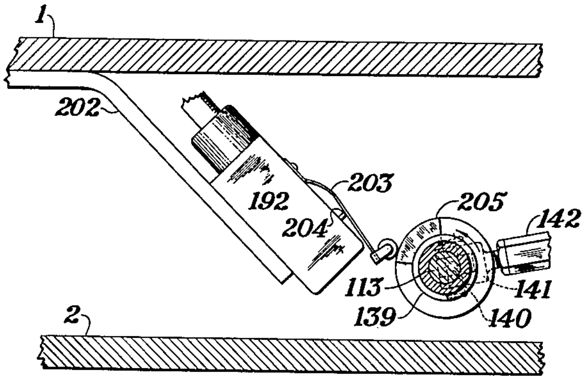
Figure 12 is a partial sectional view taken along the line 12—12 of Figure 13 looking in the direction of the arrows illustrating a ram feed safety switch.

Referring to Figures 12 and 13, the switch 192 is supported by a bracket arm 202 attached to the under surface of the main work surface plate 1. Switch 192 is of the normally open circuit type and is provided with a spring biased actuating arm 203 adapted to be pressed against the switch actuating button 204 against its inherent spring bias to move the switch to closed circuit position. The switch 192 is mounted adjacent the end of the main drive shaft 113 in position to be engaged by a sector cam 205 mounted on the crank support fitting 139. The cam 205 is positioned to engage the switch arm 203 to actuate the switch 192 to closed circuit position during the period when the switch 193 is in open circuit condition due to advancement of the insulator ram block 128' so as to maintain the energizing circuit for the main motor control relay 189 during this period. Should the ram block 128' jam in its advanced position, the switch 193 will be open but the motor circuit will be maintained for a short period of time by the switch 192 until the cam 205 rides away from the switch arm 203 at which time the switch 192 will also open, causing de-energization of the main drive motor and stopping the machine. The parts are so positioned that the cam 205 moves away from the arm 203 prior to the time at which the detent 149 engages the ratchet wheel 10 on a feeding stroke. The foregoing prevents rotation of the assembly jig if the insulator feed ram should be in its feeding position and jam for any reason.

The main start and stop switch controls 194, 196, relay 195 and switch contacts 197 are contained in a casing 206 on the main work table to the left of the assembly jig as viewed in Figure 1, see also Figure 2. Thus the main control is positioned conveniently for the operator and is adjacent the air cylinder control handle 45.

The relay 188 controlling the energizing contacts 185 for the motor 71, which actuates the automatic hopper mechanism feeding bars to the chute 73, is series connected to a two-way switch 207 having one terminal thereof connected to the energizing line 190 and the other terminal thereof connected to the main control contacts 197 in shunt with the main relay 189. The switch 207 is of the manually actuated type and is positioned on the support plate 3 directly beneath and forwardly of the ram mechanism. When this switch is in the dotted line position of Figure 14, the hopper mechanism is actuated independently of the operation of the control mechanism for the main motor 99. When this switch is thrown to the full line position of Figure 14, the hopper is energized and de-energized simultaneously with the main drive motor 99. This is the preferred operation condition.

The drive motor 175 for the staking ram mechanism is controlled by the switch contacts 184 which are actuated by the relay 187 connected to the energizing line 191 and to a normally open starting switch 208 which is shunted by a pair of relay operated contact 209. The foregoing shunt combination is series connected to the relay coil 210 for operating the switch contacts 209 and a normally closed stop switch 211 which is connected to the energizing line 190. When the switch 208 is moved to the closed circuit position, the relays 210 and 187 are energized to close the switch contacts 209 and the motor control contacts 184. Once the contacts 209 are closed, the switch 208 may be allowed to return to its normal open circuit condition. The circuit is then maintained through the shunt switch. When it is desired to stop the ram motor, the switch 211 is momentarily open circuited which deenergizes the relay 210 and allows the main contacts 209 to open.

The switch construction 208 to 211 inclusive is mounted in a casing 212 positioned adjacent the hopper control switch 207 upon the supporting plate 3 at the lower right hand corner of the machine as viewed in Figure 1.

Referring now to Figure 2, a switch 214 of the normally open circuit type is supported by a bracket 215 attached to the main work surface 1 just rearwardly of the insulator magazine and feed mechanism. The switch 214 is provided with a plunger 216 adapted to be actuated by a spring arm 217 to close the circuit to the switch 214. The spring arm 217 is biased to disengage from the plunger 216 and to project into the path of movement of the insulator feed block 90. When the insulator feed block 90 reaches the dotted line position of Figure 2, which is the point at which the magazine 82 has discharged completely, it engages the arm 217, actuates the switch 214 to closed circuit position and energizes a signal pilot light 218 mounted on the work surface 1 rearwardly of the feed mechanism.

As shown in Figure 14, the pilot 218 and switch 214 are serially connected between the energizing lines 190 and 191. This pilot light serves merely as a warning that the supply of insulators is running low; the machine can still feed the insulators in the main track 85, and a new magazine 82 should be supplied to the machine.

The main operative features of the invention may be summarized as follows: Assuming the apparatus is to be conditioned as illustrated in Figure 1, the operator manually places a combined sleeve and locking ring 30 with its associated insulating ring 31 upon the anvil 11 at which point the sleeve fits over the pilot 12 to position the same. The main starting switch 196 is held depressed for a few seconds until the main drive motor is started and the protuberance 159 is disengaged from the switch arm 160, after which the button 208 is released. The switch 207 should be actuated to start the hopper motor 71 unless the switch 207 was initially set upon the automatic position thereof in which event starting of the main drive motor also starts the hopper drive mechanism. The rams 133 and 135 now feed a bar and insulator into each of the pockets 28 through the opening 64 in the clamp structure. This action continues with the assembly jig being indexed one pocket 28 for each reciprocation of the rams during the time the rams are retracted from their feeding position. When the jig 20 has made one complete revolution, resulting in the assembly of the elements of a complete commutator annulus in the jig, the protuberance 159 actuates the switch 161 to de-energize the main drive motor. In this connection, it is noted that the number of pockets in the assembly jig and the number of teeth on the gears 10 and 156 must equal the number of segments in the commutator. All of these elements are readily removable and replaceable for conditioning the machine for assembling commutators having varying numbers of segments. Such variation in the number of segments also results in variation in size of the conductor bar segments which is accommodated by changing the size of the feed chute 73. The spring pressed guide 77 automatically accommodates itself to various sizes of commutator bar segments. The insulator bars normally do not vary in thickness for different sizes of commutators and no adjustment of the apparatus is required at this point. The top insulator ring 167 and locking ring 168 are next manually positioned as shown in Figure 10. The operator next depresses the air control valve handle 45 which results in withdrawing the dividers 25 from between the elements of the commutator annulus and drawing up of the clamps 47, 48 to clamp these elements into a tight ring resting upon and about the sleeve 30. The operator next depresses the control lever 176 for the staking mechanism which depresses the ram and stakes or rivets the end of the sleeve 30 to the locking ring 168, thus completing the commutator. After the ram is withdrawn, the operator raises the valve 45 to its initial position which releases the clamps 47 and 48 and raises the assembly jig which lifts the completed commutator clear of the assembly as sown in Figure 11 where it is removed manually and conditions the apparatus for a subsequent assembling operation.

While the invention has been illustrated and described in detail herein, it is not to be limited thereto but various changes may be made in the construction, design and arrangement of parts without departing from the spirit of the invention or the scope of the appended claims.

I claim:

1. A commutator assembling machine comprising means for supporting a commutator sleeve, an annulus assembling jig surrounding said supporting means and provided with a plurality of partitions forming an annular series of compartments arranged to surround a sleeve on said supporting means, a source of commutator bars, a source of commutator insulators, means for feeding a segment pair consisting of one bar and one insulator from said sources to one of said compartments, means for indexing said jig after each operation of said feeding means to bring a new compartment into position to receive a segment pair, means for withdrawing said partitions from said segment pairs after the segment pairs of a complete annulus have been fed into said compartments, and means for clamping said segment pairs into an annulus about a sleeve on said support after said partitions have been withdrawn.

2. A commutator assembling machine including a flat work surface having an opening therein, means for supporting a commutator sleeve and end ring in said opening with the end ring extending below said work surface, an annular assembling jig in said opening surrounding said sleeve and having a supporting surface aligned with said work surface and a plurality of partitions projecting from said supporting surface defining radial pockets about said sleeve, a clamp on said work surface about said jig, means biasing said clamp to open position away from said jig, said clamp having a pair of jaws which separate in the open position thereof to form a feed opening to said jig, means for serially depositing commutator bars and insulators on said work surface resting on their ends in front of said feed opening and having locking tangs directed toward said jig, means for guiding a segment pair consisting of one bar and one insulator from said depositing means to said jig, a pair of feed rams positioned to feed a segment pair into a pocket in said jig, means for reciprocating said rams and for indexing said jig by one pocket as said rams are retracted away from said jig after each feeding stroke thereof, and means for withdrawing said partitions from said segments and for actuating said clamp to form the segment pairs fed into said jig into a commutator annulus.

3. Apparatus according to claim 2 including means for staking a locking ring to said sleeve while said annulus is secured about said sleeve by said clamp to lock said sleeve and segments in assembled relation, and means for preventing operation of said staking means until said partitions are withdrawn from said segments.

4. Apparatus according to claim 2 including a drive motor for actuating said rams and indexing means, a pair of shunt connected switches controlling the operation of said motor, one of said switches being normally open and positioned to be actuated to close circuit position when said ram for feeding insulators is withdrawn from said jig, the other of said switches being normally open, and cam means on said indexing means for actuating said other switch to closed circuit position when said indexing means is not active to impart motion to said jig.

5. A commutator assembling machine including means for supporting a commutator sleeve and end ring, an assembling jig slidably and rotatably mounted about said supporting means including a plurality of circumferentially spaced partitions forming pockets, means for feeding a bar and an insulator into each of said pockets, a circumferential clamp having a plurality of jaws positioned about said jig, spring means biasing said clamp jaws away from said jig to be clear of bars and insulators in said pockets, a cam carried by said jig, means positioned to be actuated by said cam for drawing said clamping jaws radially inwardly of said jig, and means for withdrawing said partitions from the bars and segments in said pockets and for actuating said cam whereby said clamp is closed to clamp the bars and segments into a commutator annulus about said sleeve.

6. A commutator assembling machine comprising a horizontal work table provided with an opening, a support for holding a commutator sleeve and end ring extending into said opening, means positioned below said work table for rotatably mounting said supporting means, a commutator assembly jig slidably mounted on said support and having a plurality of partitions extending above said work table defining pockets, means for feeding a bar and an insulator into each of said pockets, a clamp having a plurality of jaws mounted on said work surface about and in spaced relation to said jig, springs biasing said jaws away from said jig, rocker arms pivotally supported on the undersides of said work table and having arms engageable with said jaws and actuating arms depending below said jig, a tapered collar on said support positioned below said jig, and means for raising and lowering said jig and said collar on said support whereby said collar engages said actuating arms to clamp a completed annulus of bars and segments about a sleeve on said support as said partitions are withdrawn from said annulus.

7. A commutator assembling machine comprising a staking anvil adapted to support a commutator end ring and sleeve, a jig having an annular series of open ended segment receiving pockets positioned concentrically of said support and mounted for sliding movement from a first position in which the bottoms of said pockets are above the lower part of a sleeve and end ring on said support to a second position in which said jig is entirely below a sleeve and end ring on said support, means for positioning a bar and an insulator in each of said pockets resting on end with their locking tangs overhanging an end ring on said support with said jig in said first position, means moving said jig to said second position to release said bars and insulators from said pockets, means for clamping said bars and insulators into an annulus about a sleeve on said anvil after withdrawal of the jig, and means for staking a locking ring to a sleeve on said anvil while said bars and commutators are clamped about such sleeve.

8. A commutator assembling machine comprising an anvil adapted to support a commutator sleeve and end ring, a bar and insulator support positioned concentrically of said anvil, a source of commutator insulators, a source of commutator bars, means including reciprocatory feed rams for bars and insulators for periodically feeding a bar and an insulator to said support, means for rotating said support between each feeding operation of said rams a distance sufficient to move the bars and insulators on said support out of the paths of said rams, an electric drive motor, means operated by said motor for driving said rams and said support rotating means, means operated by said driving means for de-energizing said motor when a number of bars and insulators sufficient to form a complete commutator annulus have been positioned on said support, means operated by said insulator feed ram for de-energizing said motor when said insulator feed ram is in feeding position, and means operated by said driving means for maintaining said motor energized independently of the position of said insulator feed ram in the periods when said support is not rotating.

9. Apparatus according to claim 8 including a staking hammer positioned to stake a locking ring to a sleeve on said anvil, means for actuating said staking hammer and means operated by said driving means for locking said staking hammer out of operation until said motor has been de-energized.

10. A commutator assembling machine comprising a support for a commutator sleeve, a jig including means forming an annular series of chambers normally positioned circumferentially of said support, a source of commutator bar segments, a source of commutator insulating segments, means for feeding a bar and an insulating segment from said sources into one of said chambers around the support, means for successively indexing said jig to align unoccupied chambers with the feeding means until the jig has been moved through a complete revolution and each chamber holds a bar and insulating segment, a clamp positioned circumferentially of the support and jig, means for moving the jig axially of the support to withdraw the chamber forming means therefrom and for actuating the clamp as the chamber forming means are withdrawn to secure an annulus of bars and segments in assembled relation on the sleeve after withdrawal of the jig, means on the machine for permanently affixing a locking ring to the sleeve and assembled bars and segments, and means for actuating the jig-moving and clamp-operating means to release the clamp and to move the jig axially of the support to its initial position to remove an assembled commutator from the support.

11. In a commutator assembling machine, an annulus assembling apparatus comprising, a work surface, an assembly jig having a supporting surface and an annular group of partitions extending from said supporting surface to form an annular group of pockets, means mounting said jig with said supporting surface aligned with said work surface, means for supplying bars and insulators to said work surface with their locking tangs facing said jig and resting on their ends, means for periodically feeding a bar and an insulator into a pocket in said jig, means for indexing said jig by one pocket between each feeding operation of said feeding means, said feeding means including a plurality of guide members on said work surface positioned to engage bars and insulators as they are supplied onto said work surface and to guide said bars across said work surface into said pockets, a clamp having a plurality of jaws mounted to move on said work surface to form an annular grip concentric with said partitions and to move away from said jig to leave a gap between two parts thereof facing said guide members to allow movement of bars and insulators into said pockets, and means for withdrawing said partitions from between bars and insulators assembled on said supporting surface and for actuating said clamp to secure said assembled bars and insulators into an annulus.

References Cited in the file of this patent

UNITED STATES PATENTS

| | | |
|---|---|---|
| 1,272,176 | Alexander | July 9, 1918 |
| 1,899,325 | Hardman et al. | Feb. 28, 1933 |
| 1,979,434 | Baker et al. | Nov. 6, 1934 |
| 2,057,692 | Rehnberg | Oct. 20, 1936 |
| 2,324,925 | Hallowell | July 20, 1943 |
| 2,394,955 | Weber | Feb. 12, 1946 |
| 2,499,539 | Swift et al. | Mar. 7, 1950 |
| 2,516,681 | Dolan | July 25, 1950 |

FOREIGN PATENTS

| | | |
|---|---|---|
| 945,445 | France | Nov. 29, 1948 |